United States Patent
Zhou et al.

(10) Patent No.: US 12,420,259 B2
(45) Date of Patent: Sep. 23, 2025

(54) PROCESSES FOR REDUCING ENVIRONMENTAL AVAILABILITY OF ENVIRONMENTAL POLLUTANTS

(71) Applicant: Albemarle Amendments, LLC, Charlotte, NC (US)

(72) Inventors: Qunhui Zhou, Concord, CA (US); Gregory H. Lambeth, Baton Rouge, LA (US); Jon E. Miller, Baton Rouge, LA (US); Timothy Allen Frost, Lynchburg, VA (US); Sascha Joerg Welz, Baton Rouge, LA (US); Se Hye Kim, Baton Rouge, LA (US)

(73) Assignee: ALBEMARLE AMENDMENTS, LLC, Charlotte, NC (US)

( * ) Notice: Subject to any disclaimer, the term of this patent is extended or adjusted under 35 U.S.C. 154(b) by 832 days.

(21) Appl. No.: 17/048,397

(22) PCT Filed: May 3, 2019

(86) PCT No.: PCT/US2019/030729
§ 371 (c)(1),
(2) Date: Oct. 16, 2020

(87) PCT Pub. No.: WO2019/213615
PCT Pub. Date: Nov. 7, 2019

(65) Prior Publication Data
US 2021/0146335 A1 May 20, 2021

Related U.S. Application Data

(60) Provisional application No. 62/666,943, filed on May 4, 2018.

(51) Int. Cl.
*B01J 20/02* (2006.01)
*B01J 20/10* (2006.01)
(Continued)

(52) U.S. Cl.
CPC ............. *B01J 20/20* (2013.01); *B01J 20/103* (2013.01); *B01J 20/12* (2013.01); *B01J 20/165* (2013.01);
(Continued)

(58) Field of Classification Search
CPC . B01J 20/20; B01J 20/103; B01J 20/12; B01J 20/165; B01J 20/28033;
(Continued)

(56) References Cited

U.S. PATENT DOCUMENTS

| | | | |
|---|---|---|---|
| 4,320,011 A | 3/1982 | Sato et al. | |
| 5,202,301 A | * 4/1993 | McNamara | ........ B01J 20/0251 502/181 |

(Continued)

FOREIGN PATENT DOCUMENTS

| | | |
|---|---|---|
| JP | H03-213144 A | 9/1991 |
| JP | 2004-089809 A | 3/2004 |

(Continued)

OTHER PUBLICATIONS

Rodriguez-Cruz, M.S., et al., "Modification of clay barriers with a cationic surfactant to improve the retention of pesticides in soils", Journal of Hazardous Materials, B139, pp. 363-372. (Year: 2007).*

(Continued)

*Primary Examiner* — Benjamin L Lebron
(74) *Attorney, Agent, or Firm* — KDW Firm PLLC

(57) ABSTRACT

This invention provides processes for reducing the environmental availability of one or more environmental pollutants in solids, liquids, and combinations of solids and liquids.

20 Claims, 1 Drawing Sheet

(51) Int. Cl.

| | |
|---|---|
| *B01J 20/12* | (2006.01) |
| *B01J 20/16* | (2006.01) |
| *B01J 20/20* | (2006.01) |
| *B01J 20/28* | (2006.01) |
| *B01J 20/30* | (2006.01) |
| *B01J 20/32* | (2006.01) |
| *B09B 3/40* | (2022.01) |
| *B09B 3/70* | (2022.01) |
| *B09B 5/00* | (2006.01) |
| *B09C 1/08* | (2006.01) |
| *C02F 1/28* | (2023.01) |
| *C02F 1/62* | (2023.01) |
| *B01J 20/04* | (2006.01) |
| *B01J 20/06* | (2006.01) |
| *B01J 20/08* | (2006.01) |
| *B09C 1/00* | (2006.01) |
| *C02F 101/20* | (2006.01) |
| *C02F 103/00* | (2006.01) |
| *C02F 103/06* | (2006.01) |
| *C02F 103/08* | (2006.01) |

(52) U.S. Cl.
CPC ..... *B01J 20/28033* (2013.01); *B01J 20/3085* (2013.01); *B09C 1/08* (2013.01); *C02F 1/288* (2013.01); *B09C 2101/00* (2013.01); *C02F 1/281* (2013.01); *C02F 1/283* (2013.01); *C02F 2101/20* (2013.01); *C02F 2103/007* (2013.01); *C02F 2103/06* (2013.01); *C02F 2103/08* (2013.01)

(58) Field of Classification Search
CPC .. B01J 20/3085; B01J 20/0266; B01J 20/027; B01J 20/043; B01J 20/06; B01J 20/08; B01J 20/10; B01J 20/14; B01J 20/3204; B01J 20/3234; B09C 1/08; B09C 2101/00; B09C 1/00; B09C 1/002; C02F 1/288; C02F 1/283; C02F 1/281; C02F 2101/20; C02F 2103/007; C02F 2103/06; C02F 2103/08; C02F 1/62; B09B 3/40; B09B 3/70; B09B 5/00
See application file for complete search history.

(56) References Cited

U.S. PATENT DOCUMENTS

| | | |
|---|---|---|
| 5,226,545 A | 7/1993 | Foust |
| 5,336,835 A | 8/1994 | McNamara |
| 5,785,935 A | 7/1998 | Fristad et al. |
| 5,928,617 A | 7/1999 | Grande |
| 5,968,461 A | 10/1999 | El-Shoubary et al. |
| 5,997,829 A | 12/1999 | Sekine et al. |
| 6,120,579 A | 9/2000 | El-Shoubary et al. |
| 6,953,494 B2 | 10/2005 | Nelson, Jr. |
| 6,962,466 B2 | 11/2005 | Vinegar et al. |
| 7,507,287 B1 | 3/2009 | Luan |
| 7,589,248 B2 | 9/2009 | Fuhrmann et al. |
| 7,692,058 B2 | 4/2010 | Fuhrmann et al. |
| 8,025,160 B2 | 9/2011 | Wang et al. |
| 8,404,038 B2 | 3/2013 | Landreth et al. |
| 8,420,033 B2 | 4/2013 | Zhang et al. |
| 8,551,431 B1 | 10/2013 | Adams et al. |
| 8,728,303 B2 | 5/2014 | Young et al. |
| 8,770,891 B2 | 7/2014 | Looney et al. |
| 8,936,686 B2 | 1/2015 | Lord, III et al. |
| 9,101,907 B2 | 8/2015 | Nalepa et al. |
| 2006/0247484 A1 | 11/2006 | Matthews |
| 2010/0025302 A1 | 2/2010 | Sato |
| 2012/0103907 A1 | 5/2012 | MacKinnon et al. |
| 2013/0272936 A1 | 10/2013 | Nalepa et al. |
| 2013/0330257 A1 | 12/2013 | Tramposch |
| 2014/0140908 A1 | 5/2014 | Nalepa et al. |
| 2016/0001261 A1* | 1/2016 | Zhou ............... B01J 20/3246 95/134 |
| 2018/0161725 A1* | 6/2018 | Klidas ............. B01D 53/8631 |

FOREIGN PATENT DOCUMENTS

| | | | |
|---|---|---|---|
| JP | 2008168288 A | 7/2008 | |
| JP | 2016-512168 A | 4/2016 | |
| JP | 2016-513586 A | 5/2016 | |
| SU | 849984 A3 | 7/1981 | |
| WO | 1996/37288 | 11/1996 | |
| WO | WO-2012071206 A1 * | 5/2012 | ......... B01D 53/025 |
| WO | 2013/169811 A2 | 11/2013 | |
| WO | 2014/143844 A1 | 9/2014 | |
| WO | 2014/144401 A1 | 9/2014 | |
| WO | WO-2016186674 A1 * | 11/2016 | ............... B01D 1/16 |
| WO | 2019/046882 A1 | 3/2019 | |
| ZA | 774109 B | 7/1978 | |

OTHER PUBLICATIONS

Bessinger, B., and C. Marks, "Treatment of mercury-contaminated soils with activated carbon: a laboratory, field, and modeling study", Remediation. (Year: 2010).*

Fernandez-Nava, Y., et al., "Use of granular bentonite in the removal of mercury (II), cadmium (II) and lead (II) from aqueous solutions", Water Air Soil Pollution, 215, pp. 239-249. (Year: 2011).*

Zhou, Q., et al., "Experimental and kinetic studies of gas-phase mercury adsorption by raw and bromine modified activated carbon", Fuel Processing Technology, 134, pp. 325-332. (Year: 2015).*

Bostick, D.A. et al. (1998). "Multi-weight Isotherm Results for Mercury Removal in Upper East Fork Poplar Creek Water", Oak Ridge National Laboratory (Report No. ORNL/TM-13582); 27 pages.

Campbell, D. O. et al. (1991). "Development Studies for the Treatment of ORNL Low-Level Liquid Waste", Oak Ridge National Laboratory (Report No. ORNL/TM-11798); 54 pages.

Hollerman, W., et al., "Results from the Low Level Mercury Sorbent Test at the Oak Ridge Y-12 Plant in Tennessee", J. Hazardous Materials, 1999, B68, 193-203.

Taylor, P.A., et al. (1999). "Results of Small Scale Tests for Removing Mercury From ORNL Process Wastewater", Oak Ridge National Laboratory (Report No. ORNL/TM-13763); 20 pages.

TN & Associates (1998). "Mercury Treatability Study Final Report, Oak Ridge Y-12 Plant, Oak Ridge, Tennessee", U.S. Dept. of Energy, Office of Environmental Management (Report No. BJC/OR-46); 57 pages.

Wang, J., et al., "Remediation of Mercury Contaminated Sites—A Review", J. Hazardous Materials, 2012, 221-222, 1-18.

U.S. EPA, Office of Superfund Remediation and Technology Innovation (Aug. 2007). Treatment Technologies For Mercury in Soil, Waste, and Water (Report No. EPA-542-R-07-003); Part I, 44 pages.

U.S. EPA, Office of Superfund Remediation and Technology Innovation (Aug. 2007). Treatment Technologies For Mercury in Soil, Waste, and Water (Report No. EPA-542-R-07-003); Part IIA, first two sections, 28 pages.

U.S. EPA, Office of Superfund Remediation and Technology Innovation (Aug. 2007). Treatment Technologies For Mercury in Soil, Waste, and Water (Report No. EPA-542-R-07-003); Parts IIB and III, 43 pages.

Zhu, Jianzhong, et al., "Modifying activated carbon with hybrid ligands for enhancing aqueous mercury removal", Carbon, 2009, 47, 2014-2025.

Gao, Da, "Analysis Of Adsorption Behavior Of Surface Doping-Modified Bamboo Activated Carbon On Mercury Ions", Public Communication of Science & Technology, Oct. 2014, No. 19, pp. 122-123.

Nelson, Jr., S., et al. "Evaluation of Fly Ash Containing B-PAC™ Brominated Mercury Sorbent". Presented at World of Coal Ash Conference, 2005, 37 pages.

(56) References Cited

OTHER PUBLICATIONS

Gilmour et al., "Activated carbon thin-layer placement as an insitu mercury remediation tool in a Penobscot River salt marsh," Science of the Total Environment, vol. 621: 839-848 (2018).

* cited by examiner

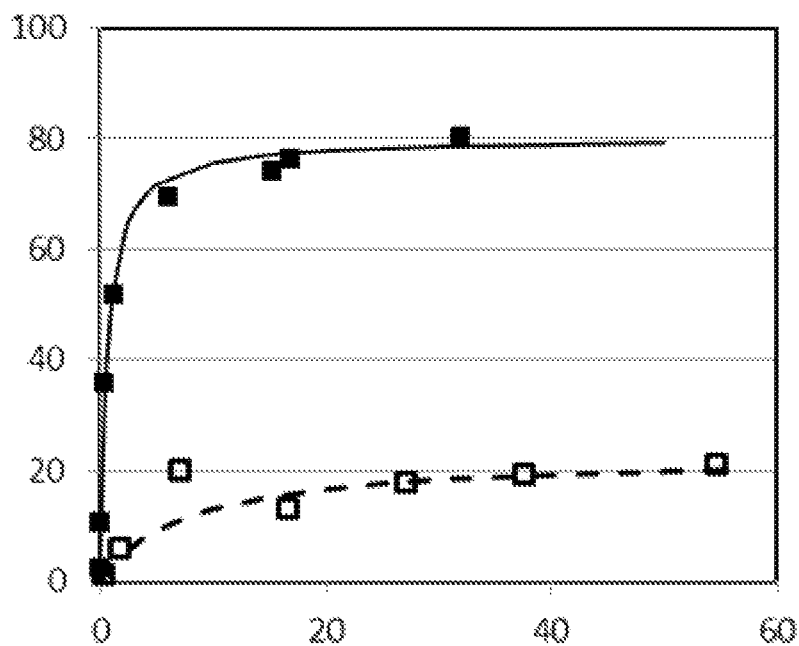

PROCESSES FOR REDUCING ENVIRONMENTAL AVAILABILITY OF ENVIRONMENTAL POLLUTANTS

REFERENCE TO RELATED APPLICATIONS

This application is the National Stage of International Patent Appl. No. PCT/US2019/030729 filed on May 3, 2019, which in turn claims the benefit of U.S. Provisional Patent Appl. No. 62/666,943, filed on May 4, 2018, the disclosures of which are incorporated herein by reference.

TECHNICAL FIELD

This invention relates to remediation of environmental pollutants to reduce their environmental availability.

BACKGROUND

Many pollutants are known be toxic to humans and to the environment. One of these known environmental pollutants, mercury, has been categorized as a priority hazardous substance by the Agency for Toxic Substances and Disease Registry (ATSDR) of the U.S. Health and Human Services Department. The U.S. National Priorities List (NPL), maintained by the U.S. Environmental Protection Agency (EPA), has listed numerous sites that were contaminated by mercury, such sites comprising various pollutant-containing substances, including solids (e.g., soil, debris, waste), liquids (e.g., groundwater, lakes, ponds), and combinations of solids and liquids (e.g., sludge, slurries, sediments). The majority of these sites have not been de-contaminated to remove mercury. Unacceptable levels of mercury or mercury compounds may also be present in sites not listed in the U.S. NPL. Environmental pollutants other than mercury raise similar concerns.

Mercury contamination can come from a variety of different sources such as mining and ore processes, chlor-alkali plants, and battery manufacturing processes. There also are many landfills contaminated with mercury-containing waste. Additionally, mercury pollutants are present in multiple forms including metallic mercury, organic mercury compounds, and inorganic mercury compounds, often at the same site. Different mercury forms and/or different substances often require different treating methods.

Mercury contaminated substances are likely to also comprise multiple other environmental pollutants. For example, some substances are also contaminated with organics and/or other heavy metals, and these other environmental pollutants provide similar challenges. Therefore, reducing the environmental availability of environmental pollutants at any particular site can be technically challenging and costly, depending on the substance that is contaminated, condition of the substance, waste types, mercury forms, and other contaminants or environmental pollutants present. Reducing the environmental availability of environmental pollutants, which in turn reduces the bio-availability of pollutants and thus their bio-accumulation, especially in substances such as soils, groundwaters, sediments, and slurries, is of particular interest.

Current commercial remediation processes applied to soils and other solids include stabilization/solidification, washing, thermal desorption, and vitrification. Processes applied to water and other liquids include precipitation/co-precipitation, adsorption, filtration, and bioremediation. Processes applied to sediments and other combinations of solids and liquids include in situ capping, dredging/excavation, a combination of these approaches, as well as Monitored Natural Recovery (MNR) and enhanced Monitored Natural Recovery (EMNR). Monitored natural recovery relies on natural processes to protect the environment and receptors from unacceptable exposures to contaminants, while enhanced MNR applies material or amendments to enhance natural recovery processes (such as the addition of a thin-layer cap or a reactive amendment such as carbon). These remediation technologies all provide benefits in controlling environmental impacts from environmental pollutants, including human health and ecological risks, but these remediation technologies also have limitations.

Another factor to be considered for some remediation technologies is the tendency for an environmental pollutant to migrate from (or leach out of) its location after it has been sequestered or stabilized. The U.S. EPA regulates this as well, and has a Toxicity Characteristic Leaching Procedure (TCLP), a test designed to determine the mobility of both organic and inorganic analytes present in liquid, solid, and multiphasic wastes.

Complicated bench- and pilot-scale research and screening tests have to be conducted to evaluate a technology to determine if it is suitable before it is selected to remediate an actual contaminated site. In addition, the variability with each site to be treated makes the remediation of mercury and other environmental pollutants contamination quite expensive and time-consuming. Thus, there is a need for new and more commercially attractive processes for reducing environmental availability and bio-availability of environmental pollutants in solids and liquids, as well as in combinations thereof.

SUMMARY OF THE INVENTION

This invention provides processes for reducing environmental availability of at least a portion of one or more environmental pollutants in a substance comprising one or more environmental pollutants. A benefit provided by the processes of this invention is a reduction of environmental availability of toxic environmental pollutants in substances. Such toxic pollutants include mercury and methyl mercury, as well as heavy metals and ecologically toxic organic matter.

An advantage provided by the processes of this invention is that by reducing environmental availability of environmental pollutants in substances, bio-availability and bio-accumulation of such pollutants is also reduced. When the environmental pollutant is mercury, another advantage is that the processes of the invention do not need sulfide to be present, and so reduction of environmental availability and thus reduction of bio-availability is not negatively affected by acidic conditions which permit sulfides to form sulfuric acid or sulfate compounds; this absence of sulfates in turn minimizes mercury methylation.

Processes of this invention can be used as the sole process for reducing the environmental availability and/or the presence of environmental pollutants, such as mercury, in a substance, or can be used to complement and/or enhance the reduction in environmental availability and/or the amount of such environmental pollutants in the substance than is attained by existing technologies.

An embodiment of this invention is a process for reducing environmental availability of at least a portion of one or more environmental pollutants in a substance comprising one or more environmental pollutants. This process comprises adding and/or applying a halogen-containing sorbent to the substance. In the halogen-containing sorbent, the halogen comprises one or more halogens selected from fluorine, chlorine, bromine, and/or iodine and one or more substrate materials. Adding and/or applying the halogen-containing sorbent to the pollutant-containing substance reduces the environmental availability of at least a portion of one or more environmental pollutants in the substance.

These and other embodiments and features of this invention will be still further apparent from the ensuing description and appended claims.

BRIEF DESCRIPTION OF THE DRAWING

The FIGURE is a graph showing equilibrium mercury adsorption isotherm data from Example 1.

The figures illustrate embodiments of specific aspects of the invention, and are not intended to impose limitations on the scope of the invention.

FURTHER DETAILED DESCRIPTION OF THE INVENTION

The present invention provides processes for reducing the environmental availability of environmental pollutants. As used throughout this document, the term "reducing environmental availability" refers to stabilizing, immobilizing, fixing, encapsulating, isolating, containing, destroying, detoxifying, decomposing, and decaying, reducing the amount of, reducing the mobility of, and/or reducing the migration ability of, at least one environmental pollutant. The stabilizing and/or immobilizing can be in a medium. Reducing the environmental availability of environmental pollutants in turn reduces the bio-availability of pollutants and thus their bio-accumulation.

As used herein, the terms "environmental pollutant" and "environmental pollutants" means a chemical element or compound or mixture thereof known be harmful humans and/or to impact the environment (ecosystem). Environmental pollutants are typically regulated by one or more government agencies. Examples of environmental pollutants include mercury in all of its forms, e.g., elemental mercury, organic mercury compounds, and inorganic mercury compounds; other organic matter (including, for example, without limitation, hydrophobic organic compounds, polycyclic aromatic hydrocarbons, polychlorinated biphenyls, dioxins, furans, and/or chlorinated pesticides); hazardous elements, organic and inorganic heavy metal compounds (including, for example, without limitation, compounds comprising As, Pb, Zn, Cu, Cr, and/or Cd); and other environmental pollutants known to those skilled in the art.

As used throughout this document, terms such as "treated", "contacted", and "remediated" indicate that the halogen-containing sorbent interacts with the substance containing one or more environmental pollutants in a manner that results in the reduction of environmental availability of one or more environmental pollutants.

The remediation agents in the practice of this invention are halogen-containing sorbents, sometimes referred to herein as "halogenated sorbents". Halogen-containing sorbents are typically formed from one or more halogen-containing compounds, and one or more substrate materials. Many substrate materials, especially activated carbons, are available or obtainable in a wide range of particle sizes, from nanometer to centimeter.

Substrate materials include carbonaceous materials and inorganic materials. Suitable carbonaceous materials include, for example, without limitation, activated carbon, carbon black, char, and coke. A preferred carbonaceous material is activated carbon, which can be used in many forms including, for example, without limitation, powdered, granular, or extruded; and high specific surface area. Powdered activated carbon is a particularly preferred form of activated carbon.

Suitable inorganic materials include inorganic oxides such as alumina (amorphous and crystalline), silica, magnesia and titania; natural zeolites, such as chabazite, clinoptilolite, and faujasite; synthetic zeolites, such as synthetic chabazite, zeolites with high Si:Al ratios (ZSM-5, beta zeolites, sodalite), zeolites with moderate Si:Al ratios (Y zeolites, A zeolites), silica alumina phosphate (SAPO) zeolites, ion exchanged zeolites, uncalcined zeolites, clay minerals such as kaolin, kaolinite, bentonite, and montmorillonite; inorganic hydroxides such as iron hydroxide; mixed metal oxides such as hydrotalcites and metallated double layered clays; diatomaceous earth; cement dust; hydroprocessing catalysts including those on substrates such as alumina, silica, or titania; $CaCO_3$; and combinations of any two or more of the foregoing. Preferred inorganic materials include inorganic oxides, especially silica, natural zeolites, especially chabazite, and clay minerals, especially kaolinite and bentonite; $CaCO_3$ is also a preferred substrate material.

The halogen element in the halogen-containing sorbent can be fluorine, chlorine, bromine, iodine, or a mixture of any two or more halogens. Bromine is a preferred halogen. Suitable halogen-containing compounds include, for example, without limitation, elemental iodine and/or iodine compounds, elemental bromine and/or bromine compounds, elemental chlorine and/or chlorine compounds, elemental fluorine and/or fluorine compounds, and other suitable halogen compounds, as will be known to those skilled in the art. Types of halogen-containing compounds that can be used include hydrohalic acids, alkali metal halides, alkaline earth halides, and ammonium halides.

Hydrohalic acids include hydrogen chloride, hydrogen bromide, and hydrogen iodide. Alkali metal halides include sodium fluoride, sodium chloride, sodium bromide, sodium iodide, potassium fluoride, potassium chloride, potassium bromide, and potassium iodide. Alkaline earth halides include magnesium chloride, magnesium bromide, calcium chloride, and calcium bromide. Ammonium halides include ammonium chloride, ammonium bromide, and ammonium iodide.

Preferred halogen-containing compounds include elemental bromine, hydrogen bromide, sodium chloride, sodium bromide, potassium iodide, and calcium bromide. Bromine-containing compounds are preferred halogen-containing compounds; more preferred are hydrogen bromide and elemental bromine, especially elemental bromine.

Halogen-containing sorbents can be made from the material and halogen-containing compounds as described in U.S. Pat. Nos. 6,953,494 and 9,101,907, and in International Patent Pub. No. WO 2012/071206. In some embodiments, preferred halogen-containing sorbents are bromine-containing sorbents. In some embodiments, preferred halogen-containing sorbents are halogen-containing activated carbons. In other embodiments, preferred halogen-containing activated carbons are chlorine-containing activated carbons, bromine-containing activated carbons, and iodine-containing activated carbons. In preferred embodiments, the halogen-containing sorbents are chlorine-containing activated carbons and bromine-containing activated carbons. In more preferred embodiments, the halogen-containing sorbents are bromine-containing activated carbons. Bromine-containing activated carbons are available commercially from Albemarle Corporation.

In other embodiments, preferred halogen-containing sorbents are chlorine-containing activated carbons and iodine-containing activated carbons. In still other embodiments, preferred halogen-containing sorbents are halogen-containing chabazites, halogen-containing bentonites, halogen-containing kaolinites, and halogen-containing silicas.

In another embodiment, preferred halogen-containing sorbents include bromine-containing silica, bromine-containing kaolinite, and bromine-containing bentonite.

The amount of halogen (or halogen content) on the material is typically equivalent to a total bromine content (or calculated as bromine) in the range of about 0.1 wt % to about 20 wt %, preferably equivalent to a total bromine content in the range of about 0.5 wt % to about 15 wt %, more preferably about 2 wt % to about 12 wt %, and still more preferably about 3 wt % to about 8 wt %, based on the total weight of the halogen-containing sorbent.

As used throughout this document, the phrases "as bromine," "reported as bromine," "calculated as bromine," and analogous phrases for the halogens refer to the amount of halogen, where the numerical value is calculated for bromine, unless otherwise noted. For example, elemental fluorine may be used, but the amount of halogen in the halogen-containing sorbent is stated as the value for bromine.

Bromine-containing activated carbons suitable for use in processes of this invention can have a wide range of particle sizes and distributions, from nanometer to centimeter; and can be formed from activated carbon forms including, for example, without limitation, powdered, granular, or extruded; high specific surface area, a variety of unique pore structures; and other features as will be familiar to those skilled in the art.

Halogen-containing sorbents, especially bromine-containing sorbents, more especially bromine-containing sorbents, can reduce environmental availability of pollutants in substances through means including, for example, without limitation, oxidation and/or adsorption. Adsorption can reduce the environmental availability of environmental pollutants by reducing mobility of such pollutants. Other ways in which halogen-containing sorbents can reduce environmental availability of pollutants are by enhancing the degradation of such pollutants through surface reactions; and/or by inhibiting the formation of pollutants such as methyl mercury; and/or by other mechanisms. In the processes of this invention, whether applied to solids, or liquids, or combinations thereof, the environmental pollutants adsorbed by halogen-containing sorbents are stabilized such that desorption into the environment is substantially minimized.

Mercury and other environmental pollutants are adsorbed onto or removed by halogen-containing sorbents, especially bromine-containing activated carbon. Different halogen (especially bromine) species can be formed on a halogen-containing sorbents, especially bromine-containing sorbents, particularly bromine-containing activated carbon. For example, bromine, one of the bromine species, can oxidize elemental mercury and form mercuric bromide which can be adsorbed into pores of activated carbon; another species, bromide ion, can chemically bond with ionic mercury for adsorption onto the surface of activated carbon; another component might catalyze mercury oxidation and enhance the stabilization or adsorption of the oxidized mercury product.

Some halogen-containing sorbents, particularly bromine-containing activated carbons, can physically and chemically adsorb mercury of different oxidation states including elemental mercury, oxidized mercury, and organic mercury. Mercury adsorbed on bromine-containing activated carbon is stable in a wide range of pH values, where "stable" means that the mercury does not separate from the sorbent in appreciable amounts after adsorption.

Sorbents used in processes of this invention can be combined with other optional components such as pH buffers (including, for example, without limitation, carbonates and phosphates); carriers (including, for example, without limitation, sand and mud); binders (including, for example, without limitation, mud, clay, and polymers); and/or other additives (including, for example, without limitation, iron compounds and sulfur compounds).

In the practice of this invention, the halogen-containing sorbent can be used in various forms, including as a dry sorbent or in combination with a suitable fluid, for example, in a slurry. As used herein, the term "suitable fluid" means fluids such as water, and other fluids. Those skilled in the art, given the teachings of this disclosure, have at hand the knowledge to select a suitable fluid, as the selection depends upon variables such as the composition of the substance, the composition of the environmental pollutants present in the substance, and the like.

Some treatments of substances can be conducted both in-situ and ex-situ.

Thermal desorption and retorting are two common ex situ methods of thermal treatment for mercury remediation. The technology heats contaminated medium to volatilize mercury, followed by condensing vapors into liquid elemental mercury. Bromine-containing activated carbon may be used to adsorb mercury as a replacement of the liquid mercury condenser or to remove mercury in off-gasses exiting the condenser.

In some applications, the halogen-containing sorbent will remain in or with the substance. In other applications, the sorbent may be collected after use. When the halogen-containing sorbent is collected after use, the sorbent can be disposed of, or regenerated and re-used.

The substances containing one or more environmental pollutants are solids, liquids, or combinations of a solid and a liquid, or combinations of one or more solids and one or more liquids. When the substance is a solid, it may comprise more than one solid. When the substance is a liquid, it may comprise more than one liquid.

In some processes of this invention, whether applied to a substance comprising one or more solids, one or more liquids, or combinations of at least one solid and at least one liquid, use of the halogen-containing sorbent can be a stand-alone remedial approach or can complement the use of other remediation methods. In other processes according to the invention, the halogen-containing sorbent can be used in addition to one or more other remediation agents in the same remediation procedure.

Adding a halogen-containing sorbent into contaminated waste adsorbs one or more pollutants. In some embodiments, the halogen-containing sorbent remains in the substance to stabilize and/or solidify the substance. In other embodiments, the combined halogen-containing sorbent and substance are placed in landfill, often with a binder and other compounds.

As used herein, the term "solid" and/or "solids", include without limitation, soil, debris, waste and other such substances known to those skilled in the art. Soil is a preferred solid to treat in the practice of this invention. Processes of the invention are provided for reducing environmental availability of at least a portion of one or more environmental pollutants in a solid comprising one or more environmental pollutants. Substances which are solids are sometimes referred to herein as solid substances.

The adding and/or applying of the halogen-containing sorbent to the solid can comprise:
(a) injecting halogen-containing sorbent into the solid, optionally through holes and/or wells and/or channels that are present in the substance, whether already present or manually created, e.g., by drilling into the substance; and/or
(b) applying the halogen-containing sorbent to a surface of the solid; and/or
(c) combining the halogen-containing sorbent with at least a portion of a surface of the solid; and/or
(d) placing the halogen-containing sorbent in a vacuum well in which the solid is treated; and/or
(e) adding the halogen-containing sorbent to a contained solid; and/or
(f) combining the halogen-containing sorbent with the solid; and/or
(g) adding the halogen-containing sorbent to a reactive barrier; and/or
(h) forming a reactive barrier containing the halogen-containing sorbent.

Combining the halogen-containing sorbent with the surface of the solid as in (c) above can be done by combining the halogen-containing sorbent with a portion of the solid, and then applying the combination of sorbent and solid to the surface of the solid, or by combining the halogen-containing sorbent with the surface of the solid.

Some preferred methods for adding and/or applying the halogen-containing sorbent to the solid are:
(a) injecting a halogen-containing sorbent into the solid;
(b) applying a halogen-containing sorbent to a surface of the solid; and/or
(c) combining a halogen-containing sorbent with at least a portion of a surface of the solid.

An embodiment of treatment of solids to reduce environmental availability of one or more environmental pollutants involves (i) drilling holes, wells, and/or channels into the solid, (ii) covering a surface of the solid with a layer of halogen-containing sorbent, and (iii) heating some parts of the solid to migrate one or more environmental pollutants, e.g., mercury, toward the surface which has halogen-containing sorbent thereon.

Another embodiment of treatment of solids to reduce environmental availability of one or more environmental pollutants involves (i) drilling holes, wells, and/or channels into the solid, (ii) filling some holes or channels with halogen-containing sorbent, and (iii) purging heated air into holes or channels to migrate one or more environmental pollutants, e.g., mercury, toward the holes filled with halogen-containing sorbent.

In some embodiments of the invention, the solid is heated to vaporize the environmental pollutant, e.g., mercury, in a vacuum well; when a halogen-containing sorbent is present in the vacuum well as in (d) above, the halogenated sorbent can absorb the vaporized environmental pollutant(s). In these procedures, the halogen-containing sorbent is placed in the vacuum well in contact with the vapor produced in the vacuum well at one or more locations before the vapor exits to atmosphere. One application of this procedure is for Soil Vapor Extraction (SVE) for mercury remediation, and halogen-containing sorbents, especially bromine-containing activated carbons, can be placed in the vacuum well to adsorb mercury.

In a particular type of solid substance, soil, halogen-containing sorbents can be utilized to immobilize mercury prior to, or during stabilization and solidification (S/S) of soil in situ and/or ex situ treatment. One ex situ process adds halogen-containing sorbent, one or more binders, and other components into a contaminated substance and mixes them together in a reactor. The mixture is then stabilized and cemented or placed in landfill. In some embodiments, bromine-containing powdered activated carbon can be used in S/S treatment processes. Mercury adsorbed by bromine-containing powdered activated carbon is stable during making and curing of concrete; see for example U.S. Pat. Nos. 8,404,038 and 8,420,033. This is advantageous because fly ash and cement are typical binders used in S/S technologies.

In another embodiment of this invention in which halogen-containing sorbents, especially bromine-containing powdered activated carbons, are remediation agents for mercury contaminated soil, the halogen-containing sorbent is spread on top of the contaminated soil. In this method the soil is not disturbed and the halogen-containing sorbent, especially a bromine-containing activated carbon, is present in the top layer of soil and blocks migration of mercury from the soil.

Halogenated sorbents, especially bromine-containing activated carbons, can be mixed with another agent to create a mixture that improves penetration of the halogen-containing sorbent into the solid, especially soil. The amount of halogen-containing sorbent added may be less than 10% of the top layer of soil, and the top layer of soil may be up to 10 cm thick. In some embodiments, a pH adjustment agent is also applied, either separately or in admixture with the halogen-containing sorbent, optionally along with an agent that improves penetration of the halogen-containing sorbent into the solid.

Processes of the invention are provided for reducing environmental availability of at least a portion of one or more environmental pollutants in a liquid comprising one or more environmental pollutants. As used herein, the term "liquid" and/or "liquids", include without limitation, groundwater, wastewater, surface water, salt water, fresh water (e.g., lakes, ponds), and other such substances known to those skilled in the art. Substances which are liquids are sometimes referred to herein as liquid substances.

The adding and/or applying of the halogen-containing sorbent and the liquid can comprise:
(a) injecting the halogen-containing sorbent into the liquid; if desired, the used sorbent can be filtered; and/or
(b) applying the halogen-containing sorbent to the surface of the liquid; and/or
(c) combining the halogen-containing sorbent with the liquid; and/or
(d) passing the liquid over a fixed bed comprising the halogen-containing sorbent; and/or
(e) passing the liquid through a filter comprising the halogen-containing sorbent; and/or
(f) pumping the liquid through a fixed bed or column containing the halogen-containing sorbent; and/or
(g) adding the halogen-containing sorbent to a contained volume of liquid.

Combining the halogen-containing sorbent with the liquid as in (c) above can be done by combining the halogen-containing sorbent with the bulk liquid, or by combining the halogen-containing sorbent with a portion of the liquid to form a slurry, and then combining the slurry with the remaining liquid.

Some substances are combinations of at least one solid and at least one liquid, and include sludge, slurries, sediments, pore water (e.g., soil pore water or sediment pore water) and other combinations of solids and liquids. Sediment, soil pore water, and sediment pore water are preferred combination substances to treat in the practice of this invention. These combinations are sometimes referred to as multiphasic substances. Processes of the invention are provided for reducing environmental availability of at least a portion of one or more environmental pollutants in a combination comprising one or more environmental pollutants. Substances which are combinations are sometimes referred to herein as combination substances.

The adding and/or applying of the halogen-containing sorbent and the combination can comprise adding and/or applying the halogen-containing sorbent to the combination. In such processes, adding and/or applying the halogen-containing sorbent to the combination can comprise:

(a) injecting the halogen-containing sorbent into the combination, optionally through holes and/or wells and/or channels that are present in the substance, whether already present or manually created, e.g., by drilling into the combination; and/or (b) applying the halogen-containing sorbent to a surface of the combination; and/or (c) combining the halogen-containing sorbent with at least a portion of a surface of the combination as described above for solid and/or liquid substances; and/or (d) combining the halogen-containing sorbent with the combination; and/or (e) placing the halogen-containing sorbent in a vacuum well in which the combination is treated, in a manner similar to that described for solid substances; and/or (f) adding the halogen-containing sorbent to a contained combination; and/or (g) covering a surface of the substance with a layer comprising the halogen-containing sorbent; and/or (h) placing the halogen-containing sorbent into a cap; and/or (i) adding the halogen-containing sorbent to a reactive barrier; and/or (j) forming a reactive barrier containing the halogen-containing sorbent; and/or (k) placing the halogen-containing sorbent within a geotextile mat.

Combining the halogen-containing sorbent with the combination as in (d) above can be done by combining the halogen-containing sorbent with the combination, or by combining the halogen-containing sorbent with a portion of the combination to form a mixture, and then combining the mixture with the surface of the combination. In these embodiments, the halogen-containing sorbent can comprise, for example, without limitation, a halogen-containing activated carbon sorbent, preferably a bromine-containing carbon sorbent, more preferably a bromine-containing activated carbon sorbent.

Some preferred methods for adding and/or applying the halogen-containing sorbent to the combination are:

(a) injecting a halogen-containing sorbent into the combination;

(b) applying a halogen-containing sorbent to a surface of the combination;

(c) combining a halogen-containing sorbent with at least a portion of a surface of the combination; and/or (d) combining a halogen-containing sorbent with the combination.

As will be clear to those skilled in the art, depending upon the substance treated, numerous variables regarding use of this invention must be considered. In all of the processes of this invention, whether applied to solids, liquids, or combinations thereof, given the teachings herein, those skilled in the art have at hand the knowledge to determine amounts of halogen-containing sorbent to use; whether to use optional components in combination with the sorbent, and, if so, the specific optional components and amounts thereof that will be beneficial; the number of applications of processes of this invention, and the period of time between such applications, that will be beneficial; whether to use processes of this invention in combination with known remediation methods, and, if so, how to do so to obtain beneficial results, etc.

The following examples are presented for purposes of illustration, and are not intended to impose limitations on the scope of this invention.

In the Examples, unless otherwise specified, the amount of mercury present in a sample was determined in an atomic absorption spectrometer with a mercury vapor analyzer via cold vapor atomic absorption (CVAA; Atomic Absorption Mercury Spectrometer with Zeeman background correction, Ohio Lumex Co., model no. RA 915+).

In all of the Examples, runs using plain (untreated) activated carbon are comparative.

EXAMPLE 1

A powdered activated carbon (average particle size 15 µm) was treated with gas phase $Br_2$ at elevated temperature in a procedure as described in U.S. Pat. No. 6,953,494 to form a bromine-containing powdered activated carbon with a bromine content of 8 wt %. The bromine-containing activated carbon sorbents were used to remove mercury from synthetic mercury-containing solutions. Bromine-containing powdered activated carbon (0.4 g/L) was placed in several reactor bottles. Solutions were prepared with $Hg(NO_3)_2$ at a pH of 2 and added to the reactor bottles containing sorbent; each reactor bottle contained a constant volume of solution prepared with a different $Hg^{2+}$ concentration. The samples were rotated for 24 hours at 32±2 rpm, and each of the resulting mixtures was passed through a syringe filter (0.45 µm pore membrane) to separate the sorbent from the liquid. Another set of experiments was conducted in parallel using untreated (plain) activated carbon for comparison. The mercury concentration of the filtered liquid from each solution was then determined.

In these experiments, the maximum mercury adsorption by the bromine-containing activated carbon was 8 wt % and for the untreated activated carbon, the maximum mercury adsorption was 3 wt %. Results are summarized in Table 1.

Both the Br-PAC and the untreated powdered activated carbon (PAC) adsorption isotherms fit a Langmuir equation; the calculated Langmuir equilibrium adsorption capacities agree with the experimental data. The FIGURE is a graph showing equilibrium mercury adsorption isotherms for both the set of runs, with the data shown as squares and the calculated Langmuir isotherms as lines for both Br-PAC (solid squares and solid line) and the comparative runs with untreated activated carbon (open squares and dashed line); where the x axis is the aqueous equilibrium Hg concentration in mg/L, and the y axis is the Hg adsorbed in mg/g sorbent.

TABLE 1

| | Hg concentration | | Hg adsorbed by sorbent | |
|---|---|---|---|---|
| Sorbent | Initial, mg/L | Aq. equil. conc., mg/L | mg/g sorbent | % |
| Br-PAC | 1 | 0.0006 | 2.19 | 99.93 |
| | 5 | 0.02 | 10.46 | 99.60 |
| | 15 | 0.47 | 35.88 | 96.94 |

TABLE 1-continued

| Sorbent | Hg concentration | | Hg adsorbed by sorbent | |
|---|---|---|---|---|
| | Initial, mg/L | Aq. equil. conc., mg/L | mg/g sorbent | % |
| | 25 | 1.34 | 51.63 | 93.96 |
| | 35 | 6.05 | 69.36 | 82.39 |
| | 45 | 15.30 | 73.90 | 66.34 |
| | 50 | 16.90 | 76.02 | 65.17 |
| | 65 | 32.01 | 80.35 | 50.71 |
| PAC | 1 | 0.36 | 1.34 | 60.10 |
| | 5 | 1.81 | 5.79 | 57.54 |
| | 15 | 7.05 | 19.80 | 54.00 |
| | 25 | 16.80 | 13.24 | 24.32 |
| | 35 | 27.20 | 17.61 | 20.82 |
| | 45 | 37.68 | 19.15 | 17.11 |
| | 65 | 54.72 | 20.87 | 13.58 |

EXAMPLE 2

A granular activated carbon with a particle size range of 0.6 mm to 2.4 mm was treated with gas phase $Br_2$ at elevated temperature in a procedure as described in U.S. Pat. No. 6,953,494 to form a bromine-containing granular activated carbon with a bromine content of 3 wt %. The bromine-containing granular activated carbon was packed into several quartz columns of 15 cm height and 1.5 cm diameter. A synthetic wastewater solution was made by adding $Hg^{2+}$ as $HgCl_2$ or $Hg(NO_3)_2$ into deionized water to an $Hg^{2+}$ concentration of ~4000 ng/l at a pH of 6.8±0.2. The synthetic wastewater solution was passed through each column from top to bottom at different flow rates, 0.1, 0.3, 0.5, and 1.0 BV/min (BV is bed volume). Influent and effluent samples were taken every three hours from each column, and the samples were analyzed for mercury content in the atomic absorption spectrometer using U.S. EPA Method 1631.

The bromine-containing granular activated carbon used in this Example is much more efficient than a commercially-available activated carbon with a particle size of 0.8 to 1.0 mm (Filtrasorb® 300, Calgon Corp.), which was tested on mercury-contaminated water near the Y-12 plant in Oak Ridge, Tennessee The data generated for the Filtrasorb® 300 sorbent is reported in T&N Associates, Mercury Treatability Study Final Report: Oak Ridge Y-12 Plant, Report BJC/OR-46, prepared for the U.S. Department of Energy, Office of Environmental Management under subcontract 395064-14-AMU, Oak Ridge, Tennessee, June 1998. Results are summarized in Table 2 below.

TABLE 2

| Flow rate | Sorbent | Hg pass through, fraction |
|---|---|---|
| 0.1 BV/min | bromine-containing activated carbon | 0.0004 |
| 0.3 BV/min | bromine-containing activated carbon | 0.0009 |
| 0.5 BV/min | bromine-containing activated carbon | 0.0015 |
| 1.0 BV/min | bromine-containing activated carbon | 0.002 |
| 0.1 BV/min | Filtrasorb ® 300 | 0.1 |
| 0.3 BV/min | Filtrasorb ® 300 | 0.15 |
| 1.0 BV/min | Filtrasorb ® 300 | 0.3 |
| 1.5 BV/min | Filtrasorb ® 300 | 0.5 |

EXAMPLE 3

This Example demonstrates that once captured by bromine-containing activated carbon, mercury from an unsaturated solution does not leach out of the bromine-containing activated carbon.

Fly ash containing bromine-containing powdered activated carbon (Br-PAC, 5 wt % Br) that contains mercury captured from flue gas was tested for mercury leaching in solutions with different pH values for several different amounts of mercury in the fly ash/Br-PAC. In these tests, each fly ash/Br-PAC sample (5 g) in each solution (100 mL) was rotated at 32±2 rpm for 24 hours, filtered, and then the filtered liquid was analyzed for mercury. Results are summarized in Table 3 below.

These TCLP tests show that mercury leachability is much lower than the U.S. EPA leachate limit at pH values of 3, 8, and 11. Even though the amount of mercury in fly ash/Br-PAC samples was higher than the (comparative) fly-ash-only baseline samples, less mercury leached out of the fly ash/Br-PAC samples than the fly-ash-only samples. Similar results were reported previously for mercury in basic leachate (pH 11.12, aq. $Na_2CO_3$) and mercury in near-neutral leachate (pH 8.03, water): Nelson, Jr., S., et al., "Evaluation of Fly Ash Containing B-PAC™ Brominated Mercury Sorbent" presented in 2005 World of Coal Ash Conference, 2005, unpublished conference presentation.

TABLE 3

| | Hg in fly ash, pre-test | Hg in leachate (pH 2.96, aq. acetic acid) | Difference $(Hg)^3$ |
|---|---|---|---|
| Extract solvent | N/A | 0.010 | N/A |
| Fly ash only[1] | 220 ppb | 0.039 ppb | 0.029 ppb |
| Fly ash/Br-PAC[2] | 898 ppb | 0.007 ppb | −0.003 ppb |
| | 1011 ppb | 0.005 ppb | −0.005 ppb |
| | 1172 ppb | 0.003 ppb | −0.007 ppb |
| | 1519 ppb | 0.002 ppb | −0.008 ppb |
| | 1740 ppb | 0.004 ppb | −0.006 ppb |

[1]Fly-ash-only samples were taken from a coal-fired power plant before injecting Br-PAC into the flue gas.
[2]Samples were taken from the same plant while Br-PAC was injected into flue gas to capture gas phase mercury; a mercury reduction of about 90% in the flue gas was observed; Br-PAC was 1.5 to 1.6 wt % of the fly ash/Br-PAC mixture.
[3]Hg in leachate of the acetic acid solution minus Hg in extract solvent; see below for explanation.

The data in Table 3 show that mercury in leachates of samples containing fly ash and bromine-containing powdered activated carbon at various pH values is minimal. The negative values in the "Difference" column in Table 3 indicate not only that the mercury adsorbed by bromine-containing activated powdered carbon was not released, but also that the bromine-containing powdered activated carbon removed mercury present in the extract solvent of acetic acid.

EXAMPLE 4

The stability of adsorbed mercury in bromine-containing powdered activated carbon (Br-PAC) in admixture with soil was tested. Br-PAC (8 wt % Br), prepared as in U.S. Pat. No. 6,953,494, was placed in contact with soil mixtures at various ratios. Each sample was treated with 50 ppm Hg (as $HgCl_2$ solutions), and then rotated for 24 hours at 32±2 rpm. The samples were then tested for their mercury adsorption capacity. When the adsorption test was completed, the solids (which include the sorbent and the soil) in each sample were separated from the liquid, and the solid samples were dried and subjected to testing under the Toxicity Characteristic Leaching Procedure (TCLP) of the U.S. EPA to determine the amount of mercury desorbed from each sample; the conditions used were 0.1 M acetic acid, pH=2.88±0.5, solid to liquid ratio (S/L) 1:20. Results are summarized in Table 4.

TABLE 4

| Sorbent | Sorbent in soil, wt % | Hg adsorbed by sorbent, mg/g sorbent | Hg desorbed, mg/g sorbent | desorbed/adsorbed | Stability Ratio, Hg adsorbed:desorbed* |
|---|---|---|---|---|---|
| Br-PAC + soil | 1.0 | 81.87 | 18.5723 | 22.69% | 4.4 |
| | 3.0 | 30.06 | 0.3196 | 1.06% | 94 |
| | 4.0 | 22.49 | 0.0755 | 0.34% | 298 |
| | 5.0 | 18.01 | 0.0371 | 0.21% | 486 |
| | 10.0 | 9.00 | 0.0067 | 0.07% | 1343 |
| | 15.0 | 6.03 | 0.0024 | 0.04% | 2512 |
| | 20.0 | 4.52 | 0.0015 | 0.03% | 3013 |
| PAC + soil | 1.0 | 87.42 | 28.8411 | 32.99% | 3.0 |
| | 3.0 | 29.98 | 6.9030 | 23.03% | 4.3 |
| | 4.0 | 22.36 | 4.8064 | 21.49% | 4.7 |
| | 5.0 | 17.89 | 3.7225 | 20.81% | 4.8 |
| | 10.0 | 8.94 | 1.1016 | 12.32% | 8.1 |
| | 15.0 | 5.98 | 0.4957 | 8.29% | 12 |
| | 20.0 | 4.47 | 0.2770 | 6.20% | 16 |

*Stability ratio was calculated as: [Hg adsorbed into sorbent, mg/g sorbent] ÷ [Hg desorbed, mg/g sorbent]

EXAMPLE 5

Kinetic data for the adsorption of mercury onto/into Br-PAC (formed as in U.S. Pat. No. 6,953,494) and plain PAC were generated. The experiments were conducted with solutions containing 50 ppm of mercury. Different amounts of sorbent were added to each mercury solution. The solutions containing sorbent were sampled at several time intervals. Results are summarized in Tables 5A-5D. The kinetic data indicate that Br-PAC reach adsorption steady status in ~30 min (at 0.5 g/l) and ~5 min (at 1.5 g/l), while plain PAC has not reached steady status in 24 hrs.

TABLE 5A

| Sorbent | Sorbent conc. | Sample time | Hg in soln. | Hg adsorbed |
|---|---|---|---|---|
| Br-PAC | 0.5 g/L | 0 min | 52.1 mg/L | 0 |
| | | 5 min | 13.7 mg/L | 74% |
| | | 30 min | 6.6 mg/L | 87% |
| | | 1 hr | 6.0 mg/L | 88% |
| | | 2 hrs | 5.8 mg/L | 89% |
| | | 4 hrs | 5.7 mg/L | 89% |
| | | 7 hrs | 5.5 mg/L | 90% |
| | | 24 hrs | 5.2 mg/L | 90% |

TABLE 5B

| Sorbent | Sorbent conc. | Sample time | Hg in soln. | Hg adsorbed |
|---|---|---|---|---|
| Br-PAC | 1.5 g/L | 0 min | 52.1 mg/L | 0 |
| | | 5 min | 0.6 mg/L | 99% |
| | | 30 min | 0.3 mg/L | 99% |
| | | 1 hr | 0.2 mg/L | 100% |
| | | 2 hrs | 0.2 mg/L | 100% |
| | | 4 hrs | 0.3 mg/L | 100% |
| | | 7 hrs | 0.2 mg/L | 100% |
| | | 24 hrs | 0.1 mg/L | 100% |

TABLE 5C

| Sorbent | Sorbent conc. | Sample time | Hg in soln. | Hg adsorbed |
|---|---|---|---|---|
| PAC | 0.5 g/L | 0 min | 48.6 mg/L | 0 |
| | | 30 min | 37.6 mg/L | 23% |
| | | 1 hr | 19.5 mg/L | 60% |
| | | 4 hrs | 26.6 mg/L | 45% |
| | | 7 hrs | 31.5 mg/L | 35% |
| | | 24 hrs | 36.5 mg/L | 25% |

TABLE 5D

| Sorbent | Sorbent conc. | Sample time | Hg in soln. | Hg adsorbed |
|---|---|---|---|---|
| PAC | 1.5 g/L | 0 min | 48.6 mg/L | 0 |
| | | 5 min | 0.3 mg/L | 99% |
| | | 30 min | 0.8 mg/L | 98% |
| | | 1 hr | 1.0 mg/L | 98% |
| | | 2 hrs | 3.7 mg/L | 92% |
| | | 4 hrs | 5.3 mg/L | 89% |
| | | 7 hrs | 16.5 mg/L | 66% |
| | | 24 hrs | 24.6 mg/L | 50% |

EXAMPLE 6

The stability of adsorbed mercury in brominated powdered activated carbon (Br-PAC) in admixture with soil at acidic conditions was tested. Br-PAC (8 wt % Br), prepared as in U.S. Pat. No. 6,953,494, was placed in contact with soil mixtures at 1 wt %. Each sample was treated with 50 ppm Hg (as an $HgCl_2$ or $Hg(NO_3)_2$ solution), and then rotated for 24 hours at 32±2 rpm. The samples were then tested for their mercury adsorption capacity. Results are summarized in Table 6.

TABLE 6

| Mixture components | Br-PAC in soil | Hg source | Aq. Hg at equil. (measured) | Hg adsorbed by mixture |
|---|---|---|---|---|
| Soil | 0 | $Hg(NO_3)_2$ | 46.575 mg/L | 5.72% |
| Br-PAC + soil | 1.0 wt % | $Hg(NO_3)_2$ | 8.675 mg/L | 82.44% |
| Soil | 0 | $HgCl_2$ | 51 mg/L | 4.67% |
| Br-PAC + soil | 1.0 wt % | $HgCl_2$ | 3.768 mg/L | 92.96% |

EXAMPLE 7

Br-PAC was made as described in U.S. Pat. No. 6,953,494. Several halogen-containing sorbents were prepared by either (1) adding an aqueous halide salt solution to the activated carbon or inorganic material, mixing very well, and then drying the mixture; or (2) blending a powdered halide salt with carbon or inorganic material until a relatively uniform mixture was obtained. These bromine-containing sorbents were tested to study their capacity to absorb mercury from synthetic mercury-containing solutions.

Halogenated sorbents were placed in reactor bottles. Solutions were prepared with $HgCl_2$ or $Hg(NO_3)_2$ and added to the reactor bottles containing sorbent; each reactor bottle contained the same concentration of $Hg^{2+}$. The samples were rotated for 24 hours at 32±2 rpm, and each of the resulting mixtures was passed through a syringe filter (0.45 μm pore membrane) to separate the sorbent from the liquid. A comparative run was conducted in parallel using untreated (plain) activated carbon. The mercury concentration of the filtered liquid from each solution was then determined. Parameters have not been optimized, especially for the halogenated sorbents made from inorganic halide salts. Results are summarized in Table 7.

TABLE 7

| Sorbent | Halogen in sorbent, wt % | Hg source | Initial pH | Aq. equil. Hg measured, mg/l | Hg adsorbed by sorbent, mg/g sorbent | Hg adsorbed by sorbent, % |
|---|---|---|---|---|---|---|
| PAC | 0 | $Hg(NO3)_2$ | 2 | 37.68 | 37.68 | 17 |
| NaBr-PAC | 8 | $HgCl_2$ | 2 | 9.43 | 9.43 | 82 |
| NaCl-PAC | 8[1] | $HgCl_2$ | 6 | 0.03 | 0.03 | 100 |
| NaCl-PAC | 5[2] | $HgCl_2$ | 6 | 12.93 | 12.93 | 74 |
| NaBr-PAC | 8 | $Hg(NO3)_2$ | 2 | 8.50 | 8.50 | 83 |
| NaCl-PAC | 8[1] | $Hg(NO3)_2$ | 2 | 33.00 | 33.00 | 33 |
| KI-PAC | 8[3] | $Hg(NO3)_2$ | 2 | 10.08 | 10.08 | 80 |
| KI-PAC | 4[4] | $Hg(NO3)_2$ | 2 | 21.28 | 21.28 | 57 |
| $CaBr_2$-Bentonite | 8 | $Hg(NO3)_2$ | 2 | 34.10 | 34.10 | 24 |
| $CaBr_2$-Chabazite | 8 | $Hg(NO3)_2$ | 2 | 33.50 | 33.50 | 26 |
| $CaBr_2$-Kaolinite | 8 | $Hg(NO3)_2$ | 2 | 31.93 | 31.93 | 29 |
| $CaBr_2$-Silica | 8 | $Hg(NO3)_2$ | 2 | 34.15 | 34.15 | 24 |

[1]Equivalent to 18 wt % calculated as bromine.
[2]Equivalent to 11.3 wt % calculated as bromine.
[3]Equivalent to 5 wt % calculated as bromine.
[4]Equivalent to 2.5 wt % calculated as bromine.

Further embodiments of this invention include, without limitation:

A) A process for reducing environmental availability of at least a portion of one or more environmental pollutants in a substance comprising one or more environmental pollutants, which process comprises adding and/or applying a halogen-containing sorbent to said substance, wherein the halogen-containing sorbent is a bromine-containing activated carbon sorbent, a chlorine-containing activated carbon sorbent, an iodine-containing activated carbon sorbent, a bromine-containing chabazite, a bromine-containing bentonite, a bromine-containing kaolinite, or a bromine-containing silica, thereby reducing environmental availability of at least a portion of one or more environmental pollutants in the substance.

B) A process according as in A) wherein the halogen-containing sorbent has a halogen content of about 0.1 to about 20 wt % calculated as bromine and based on the total weight of the halogen-containing sorbent.

C) A process according as in A) wherein the halogen-containing sorbent has a halogen content of about 0.5 wt % to about 15 wt % calculated as bromine and based on the total weight of the halogen-containing sorbent.

D) A process according as in A) wherein the halogen-containing sorbent has a halogen content of about 2 wt % to about 12 wt % calculated as bromine and based on the total weight of the halogen-containing sorbent.

E) A process according as in A) wherein the halogen-containing sorbent has a halogen content of about 3 wt % to about 8 wt % calculated as bromine and based on the total weight of the halogen-containing sorbent.

F) A process as in any of A)-E) wherein the substance is soil.

G) A process as in any of A)-E) wherein the substance is sediment.

H) A process as in any of A)-E) wherein the substance is soil pore water or sediment pore water.

I) A process as in A) wherein the sorbent is bromine-containing activated carbon, wherein the halogen content is about 0.1 wt % to about 20 wt %, calculated as bromine and based on the total weight of the halogen-containing sorbent, and wherein the substance is soil, sediment, soil pore water, or sediment pore water.

J) A process as in I) wherein the halogen content is about 0.5 wt % to about 15 wt %, preferably about 2 wt % to about 12 wt %, more preferably about 3 wt % to about 8 wt %, calculated as bromine and based on the total weight of the halogen-containing sorbent.

K) A process as in A) wherein the sorbent is a bromine-containing chabazite, a bromine-containing bentonite, a bromine-containing kaolinite, or a bromine-containing silica, wherein the halogen content is about 0.1 wt % to about 20 wt %, calculated as bromine and based on the total weight of the halogen-containing sorbent, and wherein the substance is soil, sediment, soil pore water, or sediment pore water.

L) A process as in K) wherein the halogen content is about 0.5 wt % to about 15 wt %, preferably about 2 wt % to about 12 wt %, more preferably about 3 wt % to about 8 wt %, calculated as bromine and based on the total weight of the halogen-containing sorbent.

M) A process as in A) wherein the sorbent is a chlorine-containing activated carbon, wherein the halogen content is about 0.1 wt % to about 20 wt %, calculated as bromine and based on the total weight of the halogen-containing sorbent, and wherein the substance is soil, sediment, soil pore water, or sediment pore water.

N) A process as in A) wherein the sorbent is an iodine-containing activated carbon, wherein the halogen content is about 0.1 wt % to about 20 wt %, calculated as bromine and based on the total weight of the halogen-containing sorbent, and wherein the substance is soil, sediment, soil pore water, or sediment pore water.

O) A process as in K) wherein the halogen content is about 0.5 wt % to about 15 wt %, preferably about 2 wt % to about 12 wt %, calculated as bromine and based on the total weight of the halogen-containing sorbent.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

While the present invention has been described in terms of one or more preferred embodiments, it is to be understood that other modifications may be made without departing from the scope of the invention, which is set forth in the claims below.

That which is claimed is:

1. A process for reducing environmental availability of at least a portion of one or more environmental pollutants in a substance comprising one or more environmental pollutants, which process comprises
adding and/or applying a halogen-containing sorbent to said substance, wherein the halogen-containing sorbent comprises one or more halogens selected from fluorine, chlorine, bromine, and/or iodine, and one or more substrate materials, wherein the substrate material is activated carbon, wherein the sorbent is formed from elemental iodine, elemental bromine, elemental chlorine, elemental fluorine, hydrogen chloride, hydrogen bromide, and/or hydrogen iodide and one or more substrate materials,
thereby reducing environmental availability of at least 90% of one or more environmental pollutants in the substance,
wherein the substance comprising said environmental pollutants is a solid, a liquid, or a combination of at least one solid and at least one liquid, and
wherein the halogen-containing sorbent retains at least 99% of the adsorbed environmental pollutants when exposed to desorption conditions.

2. A process according to claim 1 wherein the halogen-containing sorbent is a bromine-containing sorbent.

3. A process according to claim 1 wherein the halogen-containing sorbent is a halogen-containing activated carbon sorbent.

4. A process according to claim 1 wherein the halogen-containing sorbent is a bromine-containing activated carbon sorbent.

5. A process according to claim 1 wherein the halogen-containing sorbent has a halogen content of about 0.1 to about 20 wt % calculated as bromine and based on the total weight of the halogen-containing sorbent.

6. A process according to claim 1 wherein the substance comprising said environmental pollutants is a solid.

7. A process according to claim 6 wherein adding and/or applying the halogen-containing sorbent to the solid comprises:
(a) injecting a halogen-containing sorbent into the solid;
(b) applying a halogen-containing sorbent to a surface of the solid;
(c) combining a halogen-containing sorbent with at least a portion of a surface of the solid;
(d) placing a halogen-containing sorbent in a vacuum well in which the solid is treated;
(e) adding a halogen-containing sorbent to a contained solid;
(f) combining a halogen-containing sorbent with the solid;
(g) adding a halogen-containing sorbent to a reactive barrier; and/or
(h) forming a reactive barrier containing a halogen-containing sorbent.

8. A process according to claim 1 wherein the substance comprising said environmental pollutants is a liquid.

9. A process according to claim 8 wherein adding and/or applying the halogen-containing sorbent to the liquid comprises:
(a) injecting a halogen-containing sorbent into the liquid;
(b) applying a halogen-containing sorbent to the surface of the liquid;

(c) combining a halogen-containing sorbent with the liquid;
(d) passing the liquid over a fixed bed comprising a halogen-containing sorbent;
(e) passing the liquid through a filter comprising a halogen-containing sorbent;
(f) pumping the liquid through a fixed bed or column containing a halogen-containing sorbent; and/or
(g) adding a halogen-containing sorbent to a contained volume of liquid.

10. A process according to claim 1 wherein the substance comprising said environmental pollutants is a combination of at least one solid and at least one liquid.

11. A process according to claim 10 wherein adding and/or applying the halogen-containing sorbent to the combination comprises:
  (a) injecting a halogen-containing sorbent into the combination;
  (b) applying a halogen-containing sorbent to a surface of the combination;
  (c) combining a halogen-containing sorbent with at least a portion of a surface of the combination;
  (d) combining the halogen-containing sorbent with the combination;
  (e) placing the halogen-containing sorbent in a vacuum well in which the combination is treated;
  (f) adding the halogen-containing sorbent to a contained combination;
  (g) covering a surface of the substance with a layer comprising a halogen-containing sorbent;
  (h) placing a halogen-containing sorbent into a cap;
  (i) adding a halogen-containing sorbent to a reactive barrier;
  (j) forming a reactive barrier containing a halogen-containing sorbent; and/or
  (k) placing a halogen-containing sorbent within a geotextile mat.

12. A process according to claim 7 wherein the solid is soil.

13. A process according to claim 11 wherein the adding and/or applying comprises:
  (a) injecting a halogen-containing sorbent into the solid;
  (b) applying a halogen-containing sorbent to a surface of the solid; and/or
  (c) combining a halogen-containing sorbent with at least a portion of a surface of the solid.

14. A process according to claim 10 wherein the combination is sediment.

15. A process according to claim 14 wherein the adding and/or applying comprises:
  (a) injecting a halogen-containing sorbent into the combination;
  (b) applying a halogen-containing sorbent to a surface of the combination;
  (c) combining a halogen-containing sorbent with at least a portion of a surface of the combination; and/or
  (d) combining a halogen-containing sorbent with the combination.

16. A process according to claim 1 wherein the substance is soil or sediment, and wherein the halogen-containing sorbent is a bromine-containing activated carbon sorbent.

17. A process according to claim 1 wherein the sorbent is formed from one or more gas phase halogen-containing compounds and one or more substrate materials, and/or wherein when the halogen is bromine, the bromine is from hydrogen bromide or elemental bromine.

18. A process according to claim 1 wherein adding and/or applying the halogen-containing sorbent to the substance reduces environmental availability of at least 92% of one or more environmental pollutants in the substance.

19. A process according to claim 1 wherein adding and/or applying the halogen-containing sorbent to the substance reduces environmental availability of at least 95% of one or more environmental pollutants in the substance.

20. A process according to claim 1 wherein the halogen-containing sorbent has a stability ratio of adsorbed environmental pollutants to desorbed environmental pollutants of greater than 100 when exposed to desorption conditions.

* * * * *